April 23, 1963  E. F. MELLINGER  3,087,046
BRAZING AND HEAT TREATING APPARATUS FOR HONEYCOMB CORE PANELS
Filed Nov. 16, 1959  2 Sheets-Sheet 1

INVENTOR.
ERNEST F. MELLINGER
BY Knox & Knox

April 23, 1963 E. F. MELLINGER 3,087,046
BRAZING AND HEAT TREATING APPARATUS FOR HONEYCOMB CORE PANELS
Filed Nov. 16, 1959 2 Sheets-Sheet 2
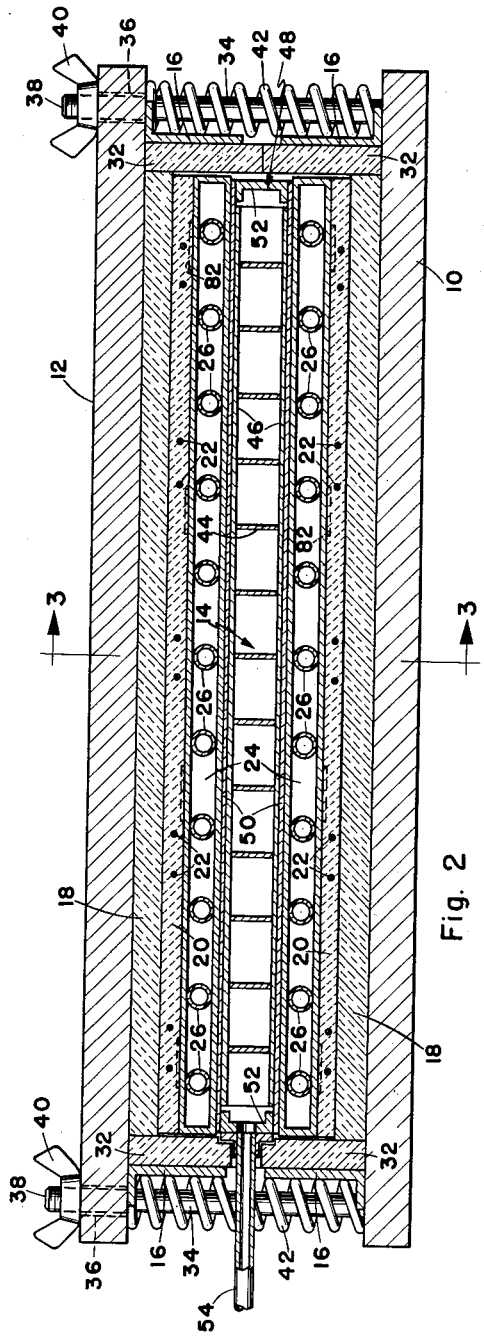
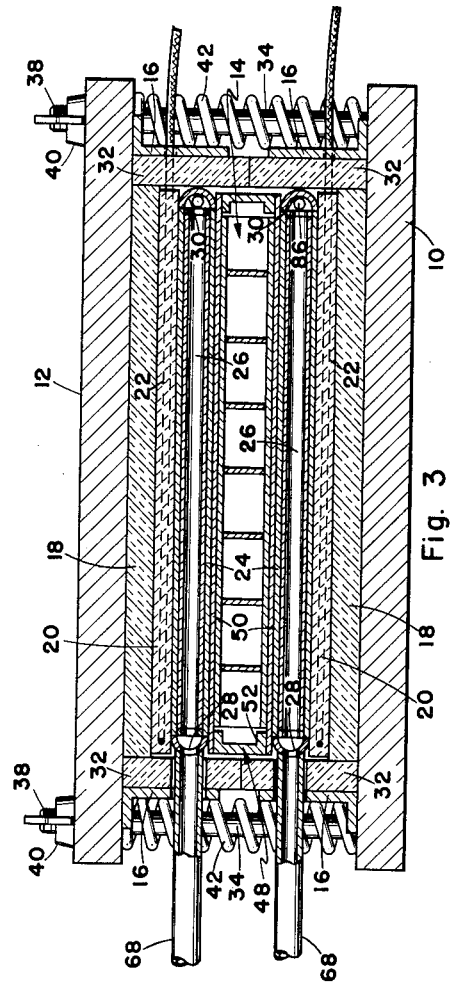
INVENTOR.
ERNEST F. MELLINGER
BY Knox & Knox

United States Patent Office

3,087,046
Patented Apr. 23, 1963

3,087,046
BRAZING AND HEAT TREATING APPARATUS FOR HONEYCOMB CORE PANELS
Ernest F. Mellinger, San Diego, Calif., assignor to Ryan Aeronautical Co., San Diego, Calif.
Filed Nov. 16, 1959, Ser. No. 853,186
7 Claims. (Cl. 219—85)

The present invention relates generally to manufacture of lightweight structural panels and more particularly to brazing and heat treating apparatus for honeycomb core panels.

The manufacture of honeycomb core panels from materials such as stainless steel presents many problems. To preserve accuracy of shape, in either flat or contoured panels, the structure must be held firmly during the brazing operation, in which a suitable brazing alloy is inserted between the core and skins and melted by heating the entire panel to complete the joint. To prevent oxidation the panel must be heated in an inert atmosphere in a suitable closed container, the entire assembly being heated in a furnace. The brazing temperature and time must be carefully controlled to prevent excess flowing of the brazing alloy and avoid possible erosion by fluxing compounds in the hot brazing alloy. After brazing, the assembly must be cooled to sub-zero temperature for transformation of the stainless steel, which necessitates removal from the furnace. Then the assembly must be reheated in the furnace to age the material. The process is involved and requires considerable time, with repeated handling of the assembly, resulting in possible distortion and making accurate timing and temperature control difficult.

The primary object of this invention, therefore, is to provide apparatus in which honeycomb core panels, particularly those of stainless steel construction, can be brazed, cooled to sub-zero temperature for transformation and reheated for aging without removal from the apparatus or adjustments of any kind, resulting in a more accurate structure with considerable savings in time and labor.

Another object of this invention is to provide apparatus in which the brazing time and temperature can be accurately controlled over the entire panel, to prevent excess heating and flowing of the brazing alloy.

Another object of this invention is to provide apparatus in which the structural panel is easily and surely maintained in an inert gas atmosphere throughout the entire treatment, to avoid oxidation and contamination.

A further object of this invention is to provide apparatus which, for panels of reasonable size, can be made self-contained and portable, greatly adding to the usefulness thereof.

Finally, it is an object to provide brazing and heat treatment apparatus of the aforementioned character which is simple, safe and convenient to operate and which will produce consistently accurate structural panels.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 2 is an enlarged sectional view taken on the line 2—2 of FIGURE 1; and

FIGURE 3 is a sectional view taken on the line 3—3 of FIGURE 2.

Similar characters of reference indicate similar or identical elements and portions throughout the specification and throughout the views of the drawings.

Figure 1:
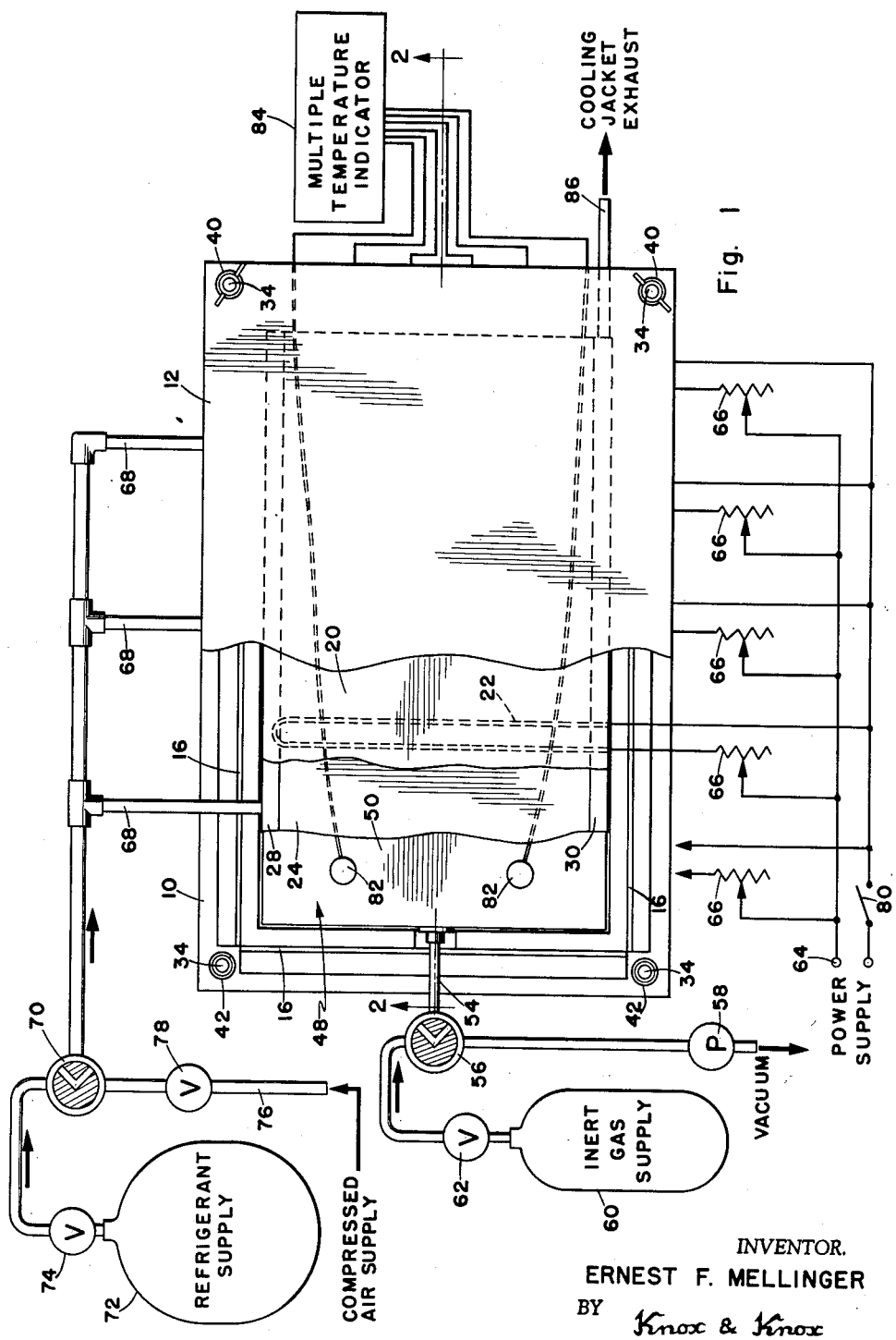
FIGURE 1 is a top plan view of the apparatus, partially cut away, the associated power equipment and services being indicated diagrammatically.

The apparatus includes a pair of thick, heavy plates which constitute a bottom platen 10 and a top platen 12. As illustrated, both platens are flat, since the honeycomb panel indicated at 14 is a flat structure, but the platens may be contoured or shaped as necessary to accommodate contoured panels, the prime factor being rigidity or inflexibility. Fixed to the bottom platen 10 are upwardly extending retaining flanges 16, inside which is an insulating pad 18 of heat resistant material resting on the face of the platen. On top of the insulating pad 18 is a heating pad or jacket 20 of heat conductive, electrically insulative material in which are embedded a plurality of resistance type heating elements 22. As illustrated, each heating element 22 is a simple elongated loop extending across the jacket, the elements being spaced along the heating jacket for complete heat coverage. While various materials may be used for the heating jacket 20, one particularly suitable material is a ceramic type substance containing approximately 90% aluminum oxide in a suitable binder, which has the desired thermal conductivity while being electrically insulated.

On top of the heating jacket 20 is a cooling jacket 24 of hollow metallic structure and containing a plurality of cooling tubes 26 extending across the jacket. At one side of the cooling jacket 24 is an inlet manifold 28 communicating with all of the tubes 26 at one end, while on the other side of said jacket is an outlet manifold 30 communicating with the other ends of said tubes, so that a fluid may be conducted throughout the cooling jacket. The precise structure of the cooling jacket is not critical and may be varied to suit various sizes and shapes of panels. All of the spaces between the edges of the heating jacket 20, cooling jacket 24 and the retaining flanges 16 are packed with insulation fillers 32, so that the only exposed surface is the top face of the cooling jacket. The cooling and heating jackets are conceived of, at least usually, being substantially coextensive in area.

The top platen 12 is arranged in a manner identical to that described for the bottom platen 10, having an insulating pad 18, heating jacket 20 and cooling jacket 24, surrounded by insulation fillers 32 and enclosed by retaining flanges 16. The bottom platen 10 has a plurality of upright locating posts 34 fixed thereto adjacent the outer edges, the top platen 12 having openings 36 through which said posts extend, the upper ends of the posts having threaded portions 38 to receive wing nuts 40. To prevent damage by dropping the top platen 12 during assembly, since the structure is necessarily heavy, compression type separator springs 42 are fitted over the locating posts 34 to hold the platens apart, all compression being applied by the wing nuts 40. The springs 42 also aid in separating the platens for dismantling the apparatus.

The honeycomb panel 14 comprises a core 44 of lightweight cellular structure, bonded between two skins 46, the specific structure of the core not being critical since many different arrangements are in use. In stainless steel honeycomb panels the skins are brazed to the core by a suitable brazing alloy, which is normally applied as thin sheets between skins and core when the panel is assembled, the process being well known. The brazing alloy has been omitted from the drawings for the purpose of clarity.

To ensure accurate alignment and proper clamping during the brazing operation, the honeycomb panel 14 is enclosed in a retort 48 comprising a pair of cover sheets 50 interconnected by a peripheral edge channel 52 to form a completely closed, pressure tight container. The retort 48 is constructed of steel or comparable material having the required heat resistance and thermal conductivity. The retort 48 is provided with a purging tube 54 extending through the edge channel 52 at a convenient point.

The retort 48 containing the honeycomb panel 14 is placed on the bottom platen 10, resting on the cooling jacket 24. The top platen 10 is then lowered over the retort and clamped in place, so that the retort is held between the two cooling jackets 24, the desired clamping pressure being applied by the wing nuts 40. For maximum thermal efficiency, the insulation fillers 32 preferably extend beyond the retaining flanges 16, so that the edges of the insulation abut and completely enclose the retort 48. The purging tube 54 is connected, through a two-way valve 56 to a vacuum pump 58 and to an inert gas supply 60, having a shut-off valve 62. The vacuum pump 58 is actuated to evacuate the retort 48, which is then filled with inert gas under low pressure, which prevents oxidation of the honeycomb panel 14 during the subsequent heat treatment. The purging means illustrated is merely diagrammatic and, for more efficient purging, the vacuum pump and inert gas supply may be connected to opposite ends of the retort 48 for a straight through flow.

All of the heating elements 22 are connected to a suitable power supply 64, each heating element being controlled through a rheostat 66 for individual, localized temperature adjustment, as indicated in FIGURE 1. The cooling jacket 24 has a plurality of inlet pipes 68 extending from the inlet manifold 28 and connected collectively, through a two-way valve 70, to a refrigerant supply 72 having a shut-off valve 74. Also connected to the inlet manifold 28, through the two-way valve 70, is a compressed air inlet 76 coupled to a suitable source of supply, normally readily available in manufacturing plants, said compressed air inlet also having a shut-off valve 78. The refrigerant supply 72 may be a pressurized container of liquid nitrogen, carbon dioxide, or the like, capable of cooling the honeycomb panel to a low, sub-zero temperature.

With the retort 48 clamped securely in place and purged with inert gas, the heating jackets 20 are turned on by a suitable switch 80 and the honeycomb panel 14 is heated to brazing temperature, the specific temperature varying with the particular brazing alloy in use. In order to maintain accurate temperature control over the entire honeycomb panel 14, a plurality of thermocouples 82, or similar temperature sensing devices, may be placed on the cover sheets 50 of the retort 48 in predetermined positions, to provide complete coverage of the heated areas. The thermocouples 82 are connected to a multiple temperature indicator 84 having individual meters, recording equipment, or the like to provide constant temperature readings of each thermocouple area. Such instruments are well known and need not be described in detail. Thus any variation in temperature between different areas of the honeycomb panel, due to differences in thermal conductance or efficiency of the heating elements 22, may be corrected by adjustment of the appropriate rheostats 66.

When the required brazing temperature is reached, the exact temperature is maintained for a period, determined by tests, to melt the brazing alloy and complete the brazed bond of the skins 46 to the core 44. As an example, a brazing temperature on the order of 1600° F. may be maintained for 30 to 45 seconds, although the actual figures may vary considerably. In this part of the operation, an excess of heat, or prolonged application of heat, causes the brazing alloy to flow into the core 44 and spread beyond the bond area, causing objectionable heat transfer to the extremely light weight core. At the same time, certain fluxes used in brazing alloys may cause erosion of the core. Thus as soon as the brazing is complete, the heating jackets 20 are switched off and the cooling jackets 24 are brought into operation. For normal use, the compressed air from inlet 76 is used to cool the honeycomb panel 14 to ambient temperature, the drop below brazing temperature being rapid. However, to accelerate cooling, the refrigerant supply 72 may be used. Both compressed air and refrigerant are exhausted from the outlet manifolds 30 through outlet pipes 86. Because of the precise control of brazing temperature, a thinner gauge of brazing alloy foil may be used, with consequent reduction in weight of the panel.

The temperature of the honeycomb panel 14 is then reduced to the sub-zero level, on the order of −100° F., to accomplish the molecular transformation of the panel, in the case of stainless steel structure, the low temperature being maintained for the required period according to the specific material. When transformation is complete, the refrigerant flow is shut off and compressed air is again fed through the cooling jackets 24 to return the honeycomb panel 14 to ambient temperature. The heating jackets 20 are sufficiently thermally conductive to ensure effective heat transfer during the cooling cycle.

Next the heating jackets 20 are again actuated to heat the honeycomb panel to aging temperature, usually between 950 and 1050° F., the aging temperature being maintained for 1½ hours, or as necessary. When aging is complete, the heating jackets 20 are switched off and the honeycomb panel 14 is cooled to ambient temperature by flooding the cooling jackets 24 with compressed air. After cooling, the top platen 12 is lifted, the retort 48 removed and cut open to retrieve the completed honeycomb panel.

The entire process is carried out in the single fixture which need not be moved at any time. For small panels, the entire apparatus may be mounted on a cart for portability to further the versatility of the apparatus. The system illustrated for operation of the apparatus is in simplified form and any additional specialized equipment for specific control of heat treatment cycles may be substituted. Similarly, the honeycomb panel 14 is illustrated as a flat, rectangular structure for simplicity. Any shape of honeycomb panel may be so handled, within the feasible limits of manufacture. For contoured panels, the platens, heating jackets and cooling jackets may be shaped to suit, or, alternatively, contour blocks of thermally conductive material such as carbon, graphite, or other easily shaped material may be used to hold the retort containing the honeycomb panel. The cooling jackets are illustrated as inside the heating jackets but even this disposition could be reversed in many instances.

In each instance, the appartus comprises simple platen structures clamped around the honeycomb panel, which is sealed in an inert gas atmosphere and enclosed between self-contained heating and cooling elements connected to a complete operative system for accurate temperature control over a wide range heat treatment cycle.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. Brazing and heat treating apparatus for honeycomb core panels, comprising: a pair of inflexible platens; a pair of cooling jackets, one mounted on each of said platens; a source of coolant communicating with said cooling jackets; a pair of heating jackets secured to and substantially coextensive in area with said cooling jackets, one pair of jackets being disposed immediately outside the other pair of jackets; each of said heating jackets having a plurality of heating elements; a power supply operatively connected to said heating elements, and each of the heating elements having individual, selectively adjustable heat control means to compensate for variation in heat capacity of different portions of said honeycomb core panels and for variation in thermal efficiency of said different heating elements; a thermally conductive, heat resistant retort dimensioned to conform closely to and completely enclose the panel to be treated; inert gas purging means connected to said retort to purge the interior of the retort; thermal insulating pads secured between said platens and said jackets; and thermal insulating elements peripherally surrounding said cooling jackets and heating jackets; clamp means interconnecting said platens to secure the platens on opposite sides of said retort, with the retort held between one pair of said jackets.

2. Brazing and heat treating apparatus for honeycomb core panels, comprising: a pair of inflexible platens; a pair of cooling jackets, one mounted on each of said platens; a source of coolant communicating with said cooling jackets; a pair of heating jackets secured to and substantially coextensive in area with said cooling jackets, one pair of jackets being disposed immediately outside the other pair of jackets; each of said heating jackets having a plurality of heating elements; a power supply operatively connected to said heating elements, and each of the heating elements having individual, selectively adjustable heat control means to compensate for variation in heat capacity of different portions of said honeycomb core panels and for variation in thermal efficiency of said different heating elements; a thermally conductive, heat resistant retort dimensioned to conform closely to and completely enclose the panel to be treated; inert gas purging means connected to said retort to purge the interior of the retort; thermal insulating pads secured between said platens and said jackets; and thermal insulating elements peripherally surrounding said cooling jackets and heating jackets; clamp means interconnecting said platens to secure the platens on opposite sides of said retort, with the retort held between one pair of said jackets; a plurality of spaced temperature sensing elements mounted in operative contact with said retort; and temperature indicating means connected to said sensing elements.

3. Brazing and heat treating apparatus according to claim 1, wherein said heating jackets each comprise a thin plate-like member of thermally conductive, electrically insulative material having a plurality of resistance type heating elements embedded therein.

4. Brazing and heat treating apparatus for honeycomb core panels, comprising: a pair of inflexible platens; a pair of cooling jackets, one mounted on each of said platens; a source of coolant communicating with said cooling jackets; a pair of heating jackets secured to and substantially coextensive in area with said cooling jackets and disposed immediately outside the pair of cooling jackets; a power supply operatively connected to said heating jackets; a thermally conductive, heat resistant retort dimensioned to conform closely to and completely enclose the panel to be treated; inert gas purging means connected to said retort to purge the interior of the retort; thermal insulating pads secured between said platens and said jackets; and thermal insulating elements peripherally surrounding said cooling jackets and heating jackets; retaining flanges fixed to said platens and securing said insulating elements in place; clamp means interconnecting said platens to secure the platens on opposite sides of said retort, with the retort held between one pair of said jackets; said insulating elements being extended beyond said retaining flanges to abut when said platens are secured together, whereby said retort is completely enclosed.

5. Brazing and heat treating apparatus for honeycomb core panels, comprising: a pair of inflexible platens; a pair of cooling jackets, one mounted on each of said platens; a source of coolant communicating with said cooling jackets; a pair of heating jackets secured to and substantially coextensive in area with said cooling jackets and disposed immediately outside the pair of cooling jackets; a power supply operatively connected to said heating jackets; a thermally conductive, heat resistant retort dimensioned to conform closely to and completely enclose the panel to be treated; inert gas purging means connected to said retort to purge the interior of the retort; and clamp means interconnecting said platens to secure the platens on opposite sides of said retort; one of said platens having a plurality of fixed locating posts generally perpendicular thereto; the other of said platens having openings through which said posts project; clamp nuts threadedly engaging the projecting ends of said posts; and compression springs on said posts between said platens to bias the platens apart.

6. Brazing and heat treating apparatus for honeycomb panels, comprising:
    means for positioning said panel;
    means for positioning a cooling jacket contiguously with each skin of said panel, said cooling jacket comprising a thermally conductive material containing a plurality of cooling tubes to permit a refrigerant to traverse said tubes and quickly lower the temperature of said panel to a sub-zero value;
    means for positioning a heating jacket contiguously with the exposed surface of said cooling jacket, to permit heat to traverse said cooling jacket when said cooling jacket is inoperative, and thus to heat said panel; and
    means comprising a pair of planar platens, for causing said jackets to apply a compressive force to said panel.

7. Brazing and heat treating apparatus for honeycomb panels, comprising:
    means for positioning said panel;
    means for positioning a cooling jacket contiguously with each skin of said panel, said cooling jacket comprising a thermally conductive material containing a plurality of cooling tubes to permit a refrigerant to traverse said tubes and quickly lower the temperature of said panel to a sub-zero value;
    means for positioning a heating jacket contiguously with the exposed surface of said cooling jacket, to permit heat to traverse said cooling jacket when said cooling jacket is inoperative, and thus heat said panel;
    means comprising a pair of planar platens, for causing said jackets to apply a compressive force to said panel; and
    a thermally-conductive heat-resistant retort dimensioned to conform closely to and completely enclosing the panel to be treated to permit purging said panel of undesirable components.

References Cited in the file of this patent

UNITED STATES PATENTS

| | | |
|---|---|---|
| 916,140 | Fulton | Mar. 23, 1909 |
| 1,458,274 | Clauson | June 12, 1923 |
| 2,693,636 | Simpelaar | Nov. 9, 1954 |
| 2,816,201 | Mulvey | Dec. 10, 1957 |
| 2,984,732 | Herbert | May 16, 1961 |
| 3,011,926 | Rowe | Dec. 5, 1961 |

FOREIGN PATENTS

| | | |
|---|---|---|
| 551,841 | Belgium | Nov. 14, 1956 |